UNITED STATES PATENT OFFICE.

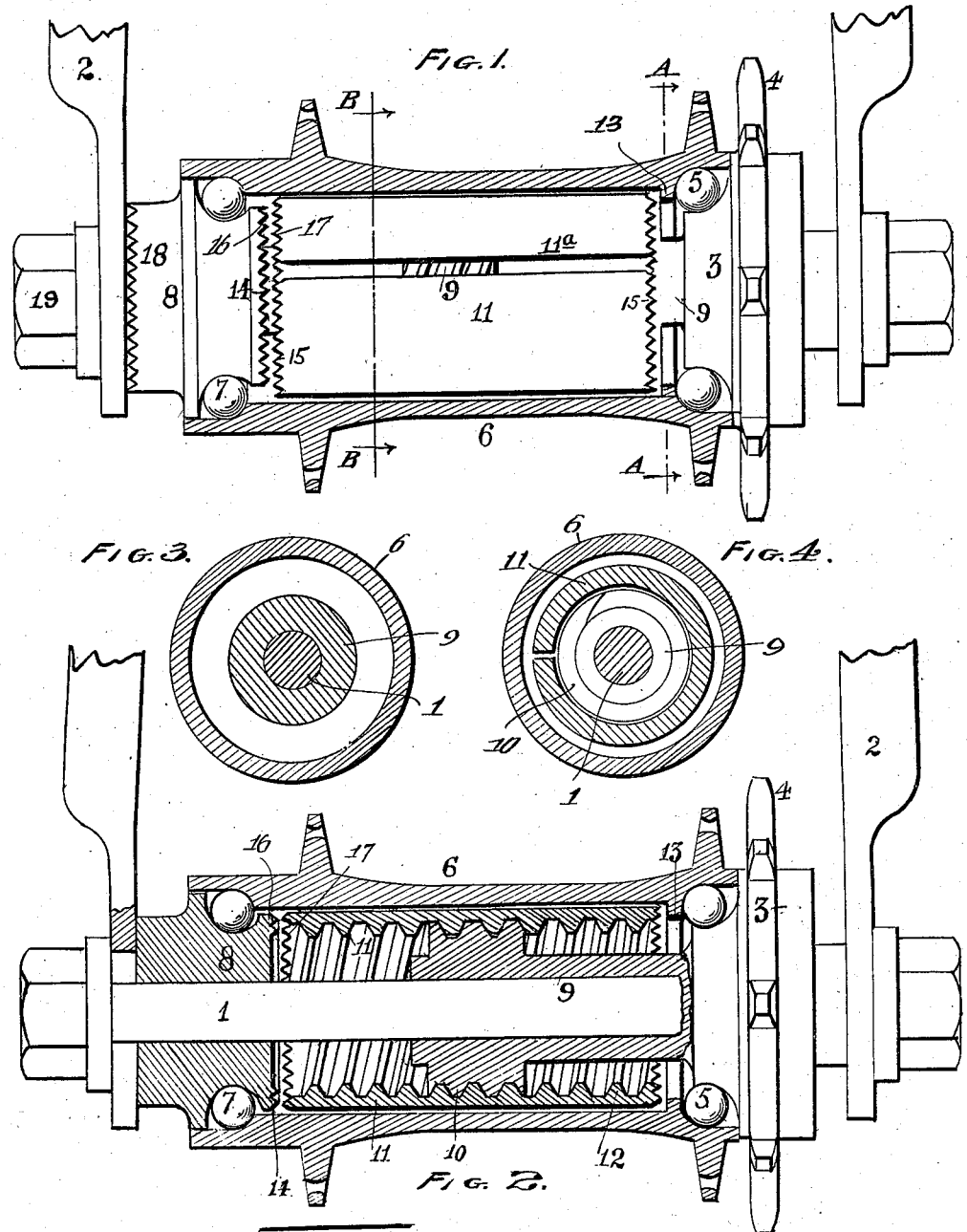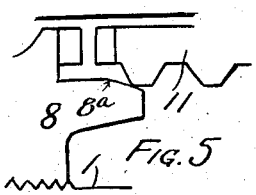

FENELON B. BROCK, OF WASHINGTON, DISTRICT OF COLUMBIA.

COASTER-BRAKE.

1,299,422.      Specification of Letters Patent.      Patented Apr. 8, 1919.

Application filed February 20, 1915. Serial No. 9,606.

*To all whom it may concern:*

Be it known that I, FENELON B. BROCK, a citizen of the United States, residing at Washington, in the District of Columbia, have invented certain new and useful Improvements in Coaster-Brakes, of which the following is a specification.

One object of my invention is to greatly simplify structures of this class. In connection with this simplification, a decidedly strong, durable and positively-acting mechanism is produced. The nature and advantages of the invention will be further explained as much as is necessary in connection with the following detailed description of an exemplifying embodiment. This embodiment is the best I have produced up to this time, but it is to be understood that the invention is capable of embodiment in different forms, and I do not limit myself to details except as claimed hereinafter.

Figure 1 is a side view of a device embodying the invention, the hub being shown in section.

Fig. 2 is a longitudinal section.

Fig. 3 is a transverse section on the line AA, Fig. 1.

Fig. 4 is a transverse section on the line BB, Fig. 1.

Reference character 1 designates an axle to be secured in the usual rear forks 2 of a bicycle or other structure. Upon this axle is revolubly mounted driver 3 which carries sprocket 4 to be driven by a chain from the usual crank-shaft sprocket. Otherwise the driver may be propelled by bevel gears or other suitable driving means. The driver provides a suitable bearing 5 for one end of wheel hub 6. The other end of the hub has a bearing 7 upon a stationary member 8 carried by the axle. The driver has a part 9 extending within hub 6 and upon this part 9 is formed helically-inclined or wedge-like threads 10. Mounted within the hub and having normally a running clearance therein is a longitudinally split sleeve 11 having internal threads 12 engaging and coöperating with threads 10 of the driver. Fig. 1 shows the longitudinal division 11ª of sleeve 11 at one side thereof, to render the sleeve expansible when properly acted upon. At one end the hub is provided with a member 13 to engage one end of sleeve 11 and toward the opposite end of the sleeve is a member 14 to be engaged by the adjacent end of the sleeve.

Upon rotating the driver forward, or so that its top moves away from the eye in Figs. 1 and 2, the driver threads 10 first move rotarily in relation to the threads of sleeve 11 and the sleeve is shifted slightly to the right as seen in said figures until its right hand end engages member 13 of the hub. Further rotation of the driver then, by reason of the wedge-like engaging faces of the driver and sleeve threads, causes expansion of the sleeve, which engages and drives the hub forward. In addition to the driving engagement afforded by the expansion of the sleeve, a driving effort is imparted to the hub by engagement of the end of the sleeve with the hub.

In cases where it is desired to make the contact between the end of the sleeve and the hub flange 13 more positive, the sleeve may be provided with serrations or teeth 15 to engage the flange, and, further, the flange may in some cases, if desirable or necessary, be provided with corresponding serrations or teeth (not shown).

When the driver 3 is held stationary, the forward rotation of the hub 6 moves sleeve 11 forward rotarily in relation to the driver member 9, thus causing the action of the threads on the driver and sleeve to move the sleeve promptly to the left and at the same time permitting the sleeve to contract. The hub is then free from the sleeve and will coast freely.

To retard or stop the wheel, the driver is moved rearward; that is, the top is moved toward the eye in Figs. 1 and 2. Relative rotary movement between the driver threads and sleeve 11 at first causes the sleeve to move to the left until its end engages stationary member 8. Further rotation of the driver in the same direction then causes expansion of the sleeve by the wedging action of the threads as previously described, and the sleeve thus engages the interior of the hub with braking friction, which may be increased by increasing the back pressure on the driver to retard the wheel to any extent or to stop it. In many cases it is desirable or necessary to provide the stationary member or brake holder 8 with serrations or teeth 16 to coöperate with serrations or teeth 17 on the adjacent end of sleeve 11. In this way, when the sleeve is shifted to the left to engage member 8, it is withheld from rotation in either direction immediately upon such engagement being effected. This causes the further rearward rotation of the driver to be positively effective to expand the sleeve for braking and after braking contact is established between the sleeve and the hub the engagement of these serrations positively prevents the forward rotation of the sleeve under the frictional forward turning effort of the hub and relieves the rider of the strain of supporting the sleeve against forward rotation during braking.

In many cases the distance between the ends of the sleeve and the hub flange 13 and holding member 8, respectively, when the sleeve is in coasting or neutral position, may be made very small and the effect of rotating the driver so as to move the sleeve away from driving position or away from braking position, as the case may be, will be sufficient to carry the sleeve to the other position so that its engagement in said other position will be sufficiently positive without the provision of special means for that purpose. In addition to this, the hub will usually be supplied with grease or other lubricant having more or less viscosity, and the yieldable connection, so to speak, afforded by said lubricant between the sleeve 11 and hub 6, or between the sleeve and some other part in respect to which it has rotation, will exercise upon the sleeve an initial retarding effect so that whenever the driver is manipulated to move the driver threads in either direction, the sleeve will at first be retarded and relative movement of the driver threads and the sleeve threads will be insured and the sleeve thus certainly moved in the required direction until it engages either with the hub flange 13 or the stationary holding member 8.

Also, in some cases, the parts may be fitted in such a manner that sleeve 11 has slight frictional contact with the hub when in coasting or neutral position, and such contact will be sufficient to insure proper shifting.

In other cases, the holding member 8 and the sleeve may be so constructed and arranged as to insure proper shifting. For example, as shown in Fig. 5, the holding member 8 may have a tapered portion 8ª adapted to frictionally engage the adjacent end of sleeve 11 as soon as the sleeve moves sufficiently away from driving position to disengage the hub or the hub flange. The frictional engagement between the sleeve and the holding member 8 so established will positively serve to carry the sleeve into braking position when the driver is turned farther to the rear, and similarly when the driver is again moved forward for driving this frictional engagement will cause the sleeve to move positively to driving position and when in driving position the sleeve will be entirely disengaged from member 8ª, so that no friction will then be created.

As clearly shown in Fig. 2, the construction may be such that the driver may be easily inserted through one end of the hub while the driver sleeve may be freely inserted through the other end. The disclosed embodiment is such, also, that the sleeve may, if desired, be made reversible so that it is of no consequence which end is inserted first. Both ends of the sleeve for instance may be provided with serrations to engage flange 13 and holder 8, respectively. The sleeve threads 12 may extend the full length of the sleeve if desired, or otherwise may extend only far enough to provide the necessary movable contact with the driver thread 10.

The holding member 8 is to be irrevolubly fixed in the vehicle forks in any convenient way; for instance, by means of serrations 18, locked against the forked side by a nut 19 on the axle. Otherwise, a brace arm or other device may extend from holder 8 and engage a part of the frame to prevent rotation. The bearings are usually ball bearings and are adjusted, and the adjustment is secured in a manner well understood by persons skilled in the art.

The helical threads may be wedge-shaped upon one side only and straight upon the other, so that an expanding movement may be given to sleeve 11 by the wedge-shaped side of the threads and a longitudinally shifting movement to the sleeve by the straight side thereof.

I claim:—

1. In coaster brakes for bicycles and the like, the combination of an axle, a hub, a driver having wedge-like threads, a sleeve within the hub and having threads coöperating with the driver threads, the threaded part of the driver being located substantially midway between the ends of the sleeve to expand the sleeve uniformly without the action of other expanding means, a member on the hub to be engaged by one end of the sleeve and a stationary holding member to be engaged by the other end of the sleeve.

2. In coaster brakes for bicycles and the like, the combination of an axle, a hub, a driver having helical wedge-shaped threads located within the hub, an expansible sleeve within the hub having threads coöperating with the driver threads, an abutment carried by the hub to coöperate with one end of the sleeve, an irrevoluble abutment for the other end of the sleeve, said abutment having frictional contact with the sleeve when the latter moves away from driving position.

3. In a coaster brake the combination with the axle, hub, driver and stationary brake holding member of a unitary expansible longitudinal split driving and braking sleeve adapted at one end to coöperate with the stationary braking member and at the other end to engage a part of the hub and coöperating wedge-like screw threads on the driver and sleeve.

4. In a coaster brake, a combined driving and braking sleeve interiorly threaded throughout its length diametrically resilient and split longitudinally.

FENELON B. BROCK.

Witneses:
D. M. SMITH,
M. A. WOOD.

Copies of this patent may be obtained for five cents each, by addressing the "Commissioner of Patents, Washington, D. C."